Oct. 29, 1957 B. J. SHERWOOD 2,811,490
LAMINATED COBALT CATALYTIC SCREEN
Filed April 6, 1954
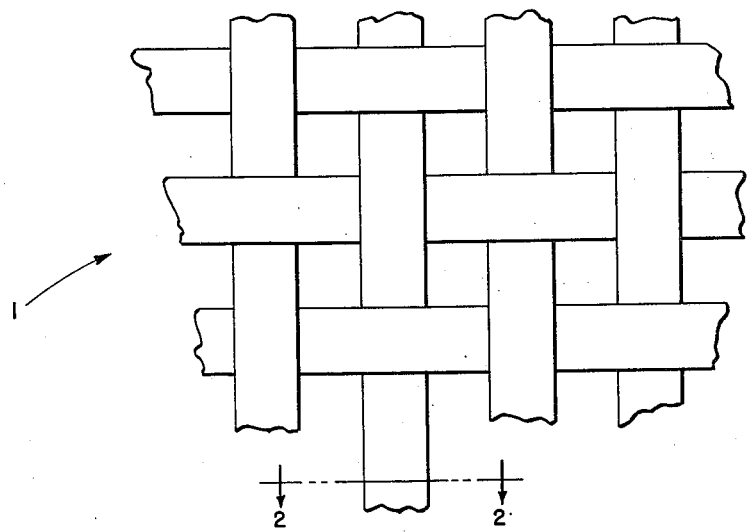
FIG. I
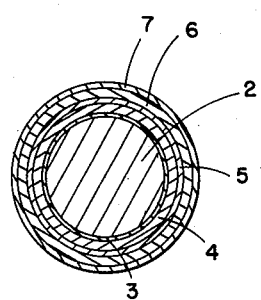
FIG. 2
INVENTOR.
BERT J. SHERWOOD
BY William R. Lane
ATTORNEY

2,811,490
LAMINATED COBALT CATALYTIC SCREEN

Bert J. Sherwood, Lakewood, Calif., assignor to North American Aviation, Inc.

Application April 6, 1954, Serial No. 421,233

6 Claims. (Cl. 252—477)

This application is a continuation-in-part of U. S. patent application Serial No. 338,247, filed February 24, 1953, now abandoned.

This invention pertains to a catalytic screen, and more particularly to a catalystic screen for decomposing hydrogen peroxide and to a process for fabricating a catalytic screen.

In the past, it has been customary to utilize a single layer cobalt screen for decomposing hydrogen peroxide. Such screens have short lives and are therefore not satisfactory for use, for example, in long-range missiles which utilize hydrogen peroxide to generate steam. This invention contemplates a laminated cobalt screen which has several layers of activated cobalt thereon whereby when one layer is no longer active the second layer is utilized.

It is therefore an object of this invention to provide an improved catalytic screen.

It is another object of this invention to provide a means which has a long life for decomposing hydrogen peroxide.

It is another object of this invention to provide a laminated catalystic screen for decomposing hydrogen peroxide.

It is another object of this invention to provide a process for fabricating a laminated catalytic screen for decomposing hydrogen peroxide.

An additional object of this invention is to provide a new and novel cobalt catalytic screen.

Other objects of invention will become apparent from the following description taken in connection with the accompanying drawing, in which:

Fig. 1 is a view of a typical screen; and
Fig. 2 is a section view of one of the wires taken at 2—2 in Fig. 1.

A section view of one of the wires of screen 1 is shown in Fig. 2. In Fig. 2 the base metal 2 is of steel or other structural base metal as seen in U. S. Patent No. 2,465,773, issued March 29, 1949. Layer 3 is a sealant layer comprising a thin layer of copper or other material inert to cobalt. Layer 4 is a layer of plated porous metallic cobalt. Layer 5 is a layer of "activated" cobalt formed by dipping the build-up screen into an aqueous solution of a mixture of silver nitrate, nitric acid and a source of cobalt ions and includes the chemical products of reaction of the silver nitrate, the nitric acid, the source of cobalt ions and at least part of the porous layer 4. Layer 6 is a layer of plated cobalt basically similar to layer 4 except in thickness and porosity and layer 7 is another layer of "activated" cobalt as layer 5. Additional alternate layers of cobalt and "activated" cobalt are placed on top of layer 7 to give an increased life to catalytic screen 1. As many alternate layers may be placed thereon as desired to make the useful life of screen 1 as long as desired. The material of layer 3 must be a material which does not react with cobalt and which will seal base material 2. The term "sealant layer" is herein defined as a relatively smooth, homogeneous metallic layer suitable as a base for the deposition of cobalt. Base material 2 must be structurally strong and must permit adherence of layer 3.

To prepare a typical example of a catalytic screen of this invention, first a galvanized 14 x 18 mesh steel screen having, for example, 0.030 inch diameter wire screen is degreased. Second, screen 1 is immersed for from 5–30 minutes in a 10% by weight solution of sodium hydroxide maintained at a temperature of from 190°–200° F. to dissolve the zinc coating from the base steel. The zinc coating is removed because zinc would not stand up under the high temperatures encountered in the $H_2O_2$ decomposition process. Further, the zinc is impure and cannot be plated upon adherently. Screen 1 should not remain in this solution after the zinc has been removed because the solution would render the bare steel passive to standard plating processes and thereby prevent good adhesion in the electroplating processes which follow. Next, the stripped screen 1 is immersed in a solution of 10% by weight sulfuric acid for an approximate period of one minute. This process removes all surface oxides from steel screen 1. If a non-galvanized steel screen is used, the screen must remain longer in the acid. The above cleaning operations are conventional and may be replaced by any other type of cleaning methods which insure a clean plating surface. Next, steel base 2 of screen 1 is plated with a layer of copper 3 which is approximately 0.00003 in thickness. The following typical solution is used and typical operating conditions observed when copper layer 3 is plated:

| Solution Constituent and Operating Condition | Concentration |
| --- | --- |
| Cuprous cyanide | 30 gms./liter. |
| Sodium cyanide | 45 gms./liter. |
| Copper (as metal) | 3.5–4.5 gms./liter. |
| Free Sodium cyanide | 1.8–2.2 oz./gal. |
| Sodium carbonate | 3.3–3.9 oz./gal. |
| Anodes | Electrolytic copper. |
| Cathode | Steel Screen. |
| Current density | 20–30 amps./sq. ft. |
| Plating time | 5–15 minutes. |

Variations in solution constituents and operating conditions may be made when thicker or thinner copper layers are desired or when other sealing layers are used. Next, a rough nodular deposit of cobalt 4 is plated upon copper 3. The deposit of cobalt is of a weight from 200–250 grams per square foot of screen area. The following typical plating solution is used and typical operating conditions observed to plate the cobalt layer upon the copper layer 3:

Solution constituents and operating conditions:

| | |
| --- | --- |
| Cobalt sulfate.$7H_2O$ | 45–50 gms./liter. |
| Ammonium sulfate | 40–45 gms./liter. |
| pH (adjust with ammonium hydroxide) | 7.4–7.5. |
| Temperature | 65–75° F. |
| Plating time | 4.25 hours. |
| Current density (cathode) | 50 amps./sq. ft. of screen area (length x width). |
| Anode-cathode, E. M. F. | 3.5–4.5. |
| Anode-cathode, distance | 3–4 inches. |
| Anodes | Cast cobalt (98%), remaining 2% are metallic impurities. |
| Preplating procedure | Air agitate the bath and sludge at tank bottom 12 hours before plating and permit to settle. |

Next, screen 1 is rinsed and ordinarily air-dried. Forced heating at temperatures which would not affect the cobalt layer may be used to cut down the over-all drying time. The resultant cobalt layer has a rough nodular finish and may best be described as being a layer of porous cobalt. This porosity is important in that in the following activation step the activation solution is able to penetrate and react with much of the cobalt layer rather than merely with the outside periphery thereof.

Screen 1 is then given a short dip of approximately one to three seconds in an aqueous solution, at room-temperature or thereabouts, having the following composition:

| | Gms./liter |
|---|---|
| Silver nitrate | 11.2–11.6 |
| Nitric acid | 24.0–25.0 |
| Cobalt nitrate | 1.5– 1.6 |

Screen 1 is then removed from this activating solution and permitted to drain and dry at room temperature or at a temperature non-injurious to the activation layer. It is not rinsed with water since the activation layer is not strongly adherent while wet. The deposited layer of activated material weighs from 4–6 grams per square foot of screen. Screen 1 is next replated with cobalt to form cobalt layer 6. The same plating solutions are used and operating conditions observed that were used and operating conditions observed that were used and observed to plate cobalt layer 4 except that the plating time to form layer 6 is only 30 minutes instead of 4.25 hours. Layer 6 weighs from 20–25 grams per square foot of screen area. Activated layer 7 is formed by again dipping screen 1 into the activating solution of silver nitrate, nitric acid and cobalt nitrate set out above and dried as indicated. Additional layers of cobalt of varying porosity, as desired, and activated cobalt can be applied to screen 1 to produce a laminated catalytic screen which has a useful life as long as desired.

It has not been found possible to accurately determine what exact product or products are formed on the plated cobalt layer after its exposure to and reaction with the silver nitrate, nitric acid and cobalt nitrate. The plated cobalt layer has a brownish color but after dipping in the activating solution takes on the appearance of a dull greenish matte. It can only be said that various complexes, possibly including metallic silver and cobalt particles, silver oxides, and various silver, cobalt and nitrogen compounds, are formed within and on the plated cobalt layer. It is for this reason that the layers 5 and 7, for example, can only be termed as activated cobalt layers formed by dipping the cobalt layered screen into the aforementioned activating solution.

The above recited activation solution includes with the silver nitrate and nitric acid, a source of cobalt ions. Typically, as set out above, this source of cobalt ions is cobalt nitrate. Other sources of cobalt ions, either cobaltic or cobaltous, may be used as long as the cobalt compound or metal goes into solution with the recited concentrations of silver nitrate and nitric acid and if the source does not bring in other ions which are detrimental to the activation of the plated cobalt layers.

In operation the catalytic structure of the instant invention is placed in a stream of hydrogen peroxide which is to be decomposed to generate steam. As the activated layer of the catalytic mass, including that in the interstices of the plated porous cobalt layer, is used up the next layer of activated cobalt becomes exposed to the steam and catalyzes the decomposition. A catalytic screen having a capability for high steam generation for a relatively longer period than prior screens is the result of the instant invention.

Thus, this invention provides a laminated cobalt catalytic screen for decomposing hydrogen peroxide which has a useful life that is many times longer than any catalytic screen heretofore produced.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A catalytic screen comprising a steel screen, a copper sealing layer thereon, an electroplated porous cobalt layer on said copper layer, and an activated cobalt layer formed by dipping the cobalt layered steel screen into an aqueous solution of silver nitrate, nitric acid and cobalt nitrate, said activated cobalt layer including the products of reaction of said solution and said first-mentioned cobalt layer.

2. The invention as claimed in claim 1 in which a further porous cobalt layer and a second activated cobalt layer, the latter formed as said first-mentioned activated layer, are included on said first-mentioned activated layer.

3. The invention as claimed in claim 1 wherein additional alternate layers of porous cobalt and activated cobalt are formed on said first-mentioned activated layer.

4. A catalytic structure comprising a copper plated ferrous metal base, an electroplated porous cobalt layer on said base, a layer of activated cobalt over said porous cobalt layer, a further porous cobalt layer and a further layer of activated cobalt over said second-mentioned porous cobalt layer, said activated cobalt layers formed by dipping said porous cobalt layered base into an aqueous solution of silver nitrate, nitric acid and a cobalt salt soluble in nitric acid.

5. A process for fabricating a catalytic screen comprising cleaning a structural metal base screen, plating said screen with a cobalt-inert metallic sealing layer, electroplating said screen with a porous deposit of cobalt, drying said screen, dipping said screen into an aqueous solution of silver nitrate, nitric acid and cobalt nitrate, drying said screen, electroplating said screen with a further porous deposit of cobalt, drying said screen, dipping said screen into an aqueous solution of silver nitrate, nitric acid and a source of cobalt ions, and drying said screen.

6. A process for fabricating a catalytic screen comprising plating a clean steel screen with a copper sealing layer, electroplating said sealing layer with a porous cobalt layer, dipping said cobalt layered screen into an aqueous solution of silver nitrate, nitric acid and cobalt nitrate to form an actuated cobalt layer and alternately repeating the last two mentioned steps whereby a laminated screen of a plurality of alternating layers of porous cobalt and activated cobalt is formed.

References Cited in the file of this patent

UNITED STATES PATENTS

| 1,043,580 | Eldred | Nov. 5, 1912 |
| 1,907,710 | Bass | May 9, 1933 |
| 2,330,539 | Auchter | Sept. 28, 1943 |
| 2,453,668 | Marisic et al. | Nov. 9, 1948 |
| 2,465,773 | Wernland | Mar. 29, 1949 |
| 2,653,879 | Fink | Sept. 29, 1953 |

OTHER REFERENCES

Treatise on Chemistry, by Roscoe and Schorlemmer, vol. 1, pages 340 and 341 (1920).